(12) United States Patent
Tomes (10) Patent No.: US 10,641,325 B1
(45) Date of Patent: May 5, 2020

(54) DAMPING DEVICE FOR A BEARING HOUSING

(71) Applicant: PRATT & WHITNEY CANADA CORP., Longueuil (CA)

(72) Inventor: Nathan Tomes, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/159,139

(22) Filed: Oct. 12, 2018

(51) Int. Cl.
| | |
|---|---|
| F16C 27/04 | (2006.01) |
| F16C 19/52 | (2006.01) |
| F01D 25/16 | (2006.01) |
| F16F 15/023 | (2006.01) |

(52) U.S. Cl.
CPC .......... *F16C 19/527* (2013.01); *F01D 25/164* (2013.01); *F16C 27/045* (2013.01); *F16F 15/0237* (2013.01); F05D 2220/32 (2013.01); F05D 2240/54 (2013.01); F05D 2260/96 (2013.01); F16C 2360/23 (2013.01)

(58) Field of Classification Search
CPC .. F16C 19/527; F16C 27/045; F16C 2360/23; F16C 15/0237; F01D 25/164
See application file for complete search history.

(56) References Cited

U.S. PATENT DOCUMENTS

| | | | |
|---|---|---|---|
| 3,901,557 | A | 8/1975 | Daniels |
| 4,337,982 | A | 7/1982 | Moringiello |
| 5,501,531 | A | 3/1996 | Hamaekers |
| 7,517,152 | B1 * | 4/2009 | Walsh ............... F16C 23/08 384/99 |
| 8,272,786 | B2 | 9/2012 | Cottrell |
| 8,591,117 | B2 * | 11/2013 | Giraud ............... F16C 27/045 384/535 |
| 8,647,049 | B2 | 2/2014 | Evans |
| 9,016,952 | B2 | 4/2015 | Bedenk |
| 9,429,191 | B2 * | 8/2016 | Ertas ............... F01D 25/164 |
| 9,500,100 | B2 | 11/2016 | Carter |
| 9,841,077 | B2 | 12/2017 | Modrezejewski et al. |
| 9,879,750 | B2 | 1/2018 | Husband et al. |
| 10,001,166 | B2 | 6/2018 | Ertas et al. |
| 2017/0298988 | A1 * | 10/2017 | Mook ............... F16C 17/02 |

OTHER PUBLICATIONS

Delta Flex Rubber Parts Catalog.com; Lord Fluidlastic Mounts—Viscous Mount : http://rubberpartscatalog.com/home/products/vibration-control/fluidlastic-mounts, consulted on Jun. 3, 2018.

* cited by examiner

*Primary Examiner* — Phillip A Johnson
(74) *Attorney, Agent, or Firm* — Norton Rose Fulbright Canada LLP (57) ABSTRACT

A damping device for connecting a bearing housing to a bearing outer race is provided. The damping device may permit an allowable range of radial movement of the bearing. The damping device has an elastomeric body connected to one of the bearing outer race and the bearing housing and a cover portion connected to the other one of the bearing outer race and the bearing housing. It also has two or more deformable fluid chambers fluidly connected to one another via at least one orifice and in which fluid is encapsulated. The damping device may dissipate at least partially vibrations travelling between the bearing housing and the bearing outer race by compressing its elastomeric body and by discharging fluid from one fluid chamber to another. There may be a plurality of such damping devices disposed circumferentially about the bearing outer race.

20 Claims, 5 Drawing Sheets

FIG-1

DAMPING DEVICE FOR A BEARING HOUSING

The application relates generally to bearing assemblies in a gas turbine engine and, more particularly, to bearing mountings in a gas turbine engine.

BACKGROUND OF THE ART

Gas turbine engines typically include bearings to support one or more rotating shafts, such as low-pressure compressor rotor, high-pressure compressor rotor, fan rotor. Known bearing assemblies, including bearing housings, may typically have limited capacity of reducing vibration transmission, for instance vibrations imparted by a rotating shaft to the static structures of gas turbine engines via the bearing, and/or reduce loads transmitted to such static structures, such that this may limit performances of gas turbine engines.

SUMMARY

In one aspect, there is provided a bearing support for a bearing housing, comprising: a plurality of damping devices connecting the bearing housing to an outer race of the bearing, the plurality of damping devices disposed circumferentially about the bearing outer race and spaced apart from one another, the damping devices including: an elastomeric body, a cover portion, at least a first and a second deformable fluid chambers fluidly connected to one another via at least one orifice, the first and second fluid chambers disposed between the elastomeric body and the cover portion, at least one of the at least first and second fluid chambers configured to discharge fluid into the other one of the at least first and second fluid chambers upon deforming the elastomeric body.

In another aspect, there is provided A bearing support for a bearing housing, comprising a plurality of elasto-fluid dampers connecting the bearing housing to a bearing outer race, the plurality of elasto-fluid dampers disposed circumferentially about the bearing outer race and spaced apart from one another.

In a further aspect, there is provided a method for dissipating at least partially vibrations travelling between a bearing housing and a bearing outer race using a plurality of damping devices interconnecting said bearing housing and said bearing outer race, the method comprising: compressing an elastomeric body of at least one of the damping devices, thereby deforming said elastomeric body in a compressed state and incidentally absorbing at least partially vibrations passing through the at least one of the damping devices; deforming a first fluid chamber of the at least one of the damping devices as a result of the compressing; and discharging fluid contained in the first fluid chamber towards a second fluid chamber of the at least one of the damping devices as a result of the deforming, the fluid flowing through at least one orifice fluidly connecting said first and second fluid chambers together, thereby damping at least partially vibrations passing through the at least one of the damping devices.

DESCRIPTION OF THE DRAWINGS

Reference is now made to the accompanying figures in which.

DETAILED DESCRIPTION

Figure 1:
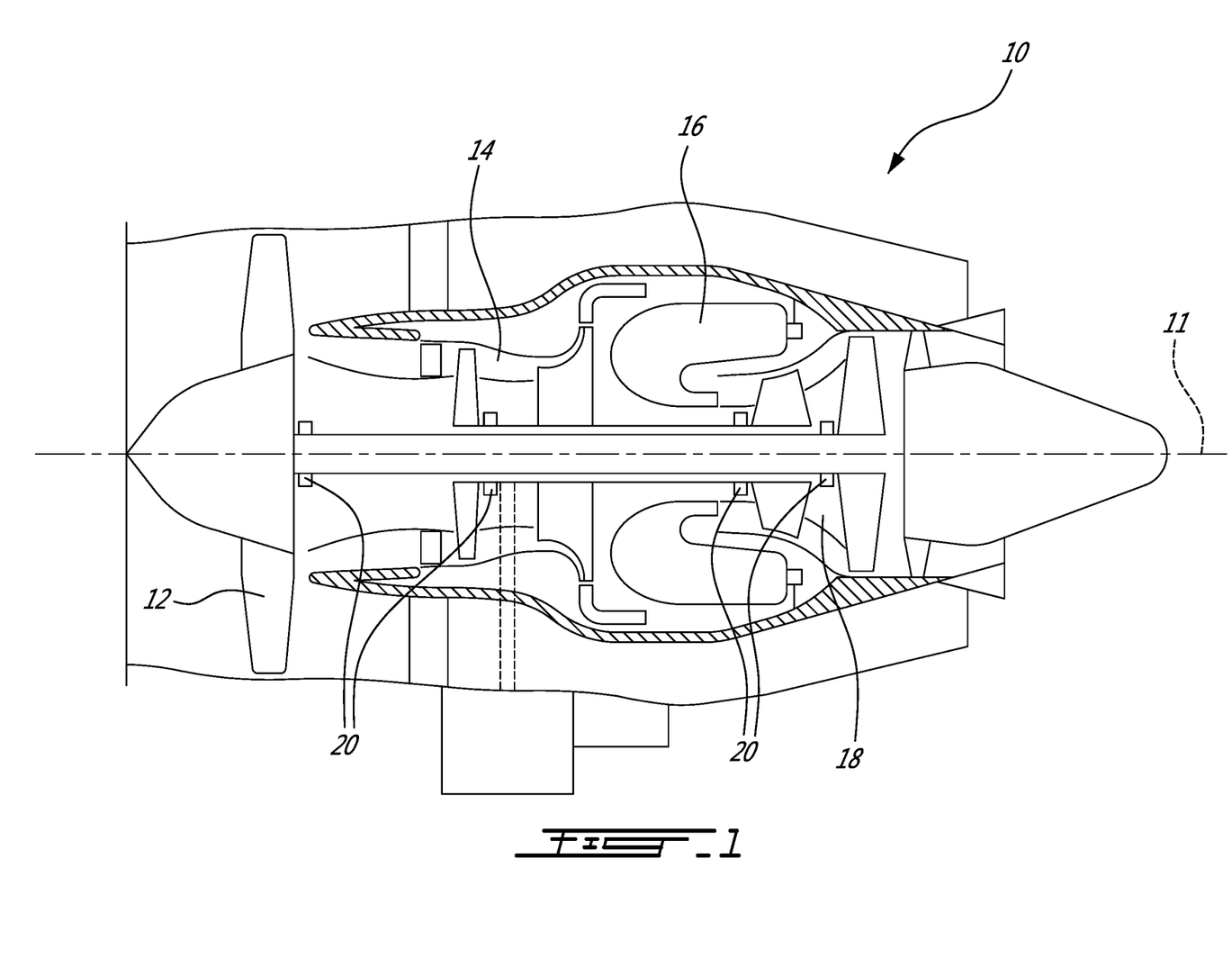
FIG. 1 is a schematic cross-sectional view of a gas turbine engine, according to a particular embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 also includes one or more rotating shaft(s) mounted thereto using mounting devices allowing rotational and/or axial movement, with two distinct shafts shown in FIG. 1. For instance, the compressor section 14 and the turbine section 18 may each have a single shaft or multiple independent shafts in parallel or in series, rotating dependently or independently, depending on the types of turbine engine, and mounted to the gas turbine engine 10 in many suitable ways.

Referring to FIG. 1, the mounting devices for mounting rotating shafts in the gas turbine engine 10 may be bearings 20, such as ball bearings, roller bearings, thrust bearings, or any other suitable types of bearings. Also, there may have a combination of different types of bearings 20 inside the gas turbine engine 10.

Figure 2:
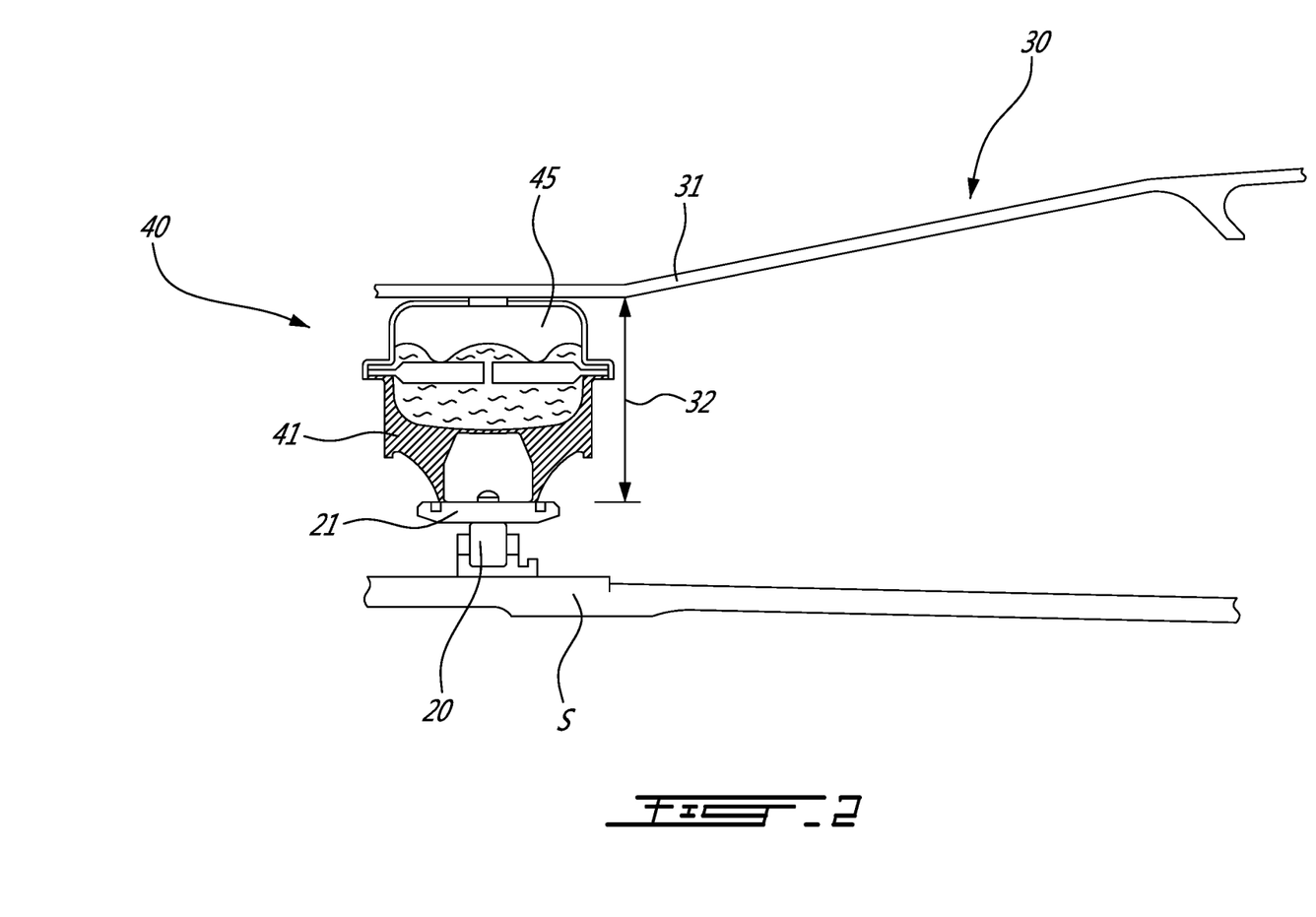
FIG. 2 is a schematic cross-sectional fragmentary side view of a bearing housing used in a gas turbine engine such as illustrated in FIG. 1, according to a particular embodiment.

Referring to FIG. 2, one of the bearings 20 in the gas turbine engine 10 is supported by a bearing housing 30. An attenuation of vibration loads induced by the rotating shaft S or some components mounted thereon like the fan 12 (e.g. vibrations generated by the airflow inside or outside the engine) and transmitted via the bearing 20 to other components of the gas turbine engine 10 may be desirable. In the present case, the bearing housing 30 is configured to reduce (e.g. limit) vibration loads transmitted via the bearing 20 to other components of the gas turbine engine 10. A bearing support connects the bearing housing 30 to the bearing 20. The bearing support includes a plurality of damping devices 40 that may absorb (e.g. damp) at least partially vibration loads transmitted via the bearing 20 to the bearing housing 30 and the remainder of the engine 10 structure over an allowable range of radial movement of the bearing 20 relative to said bearing housing 30, over that of a typical bearing housing/bearing assembly without such damping devices 40.

Figure 3:
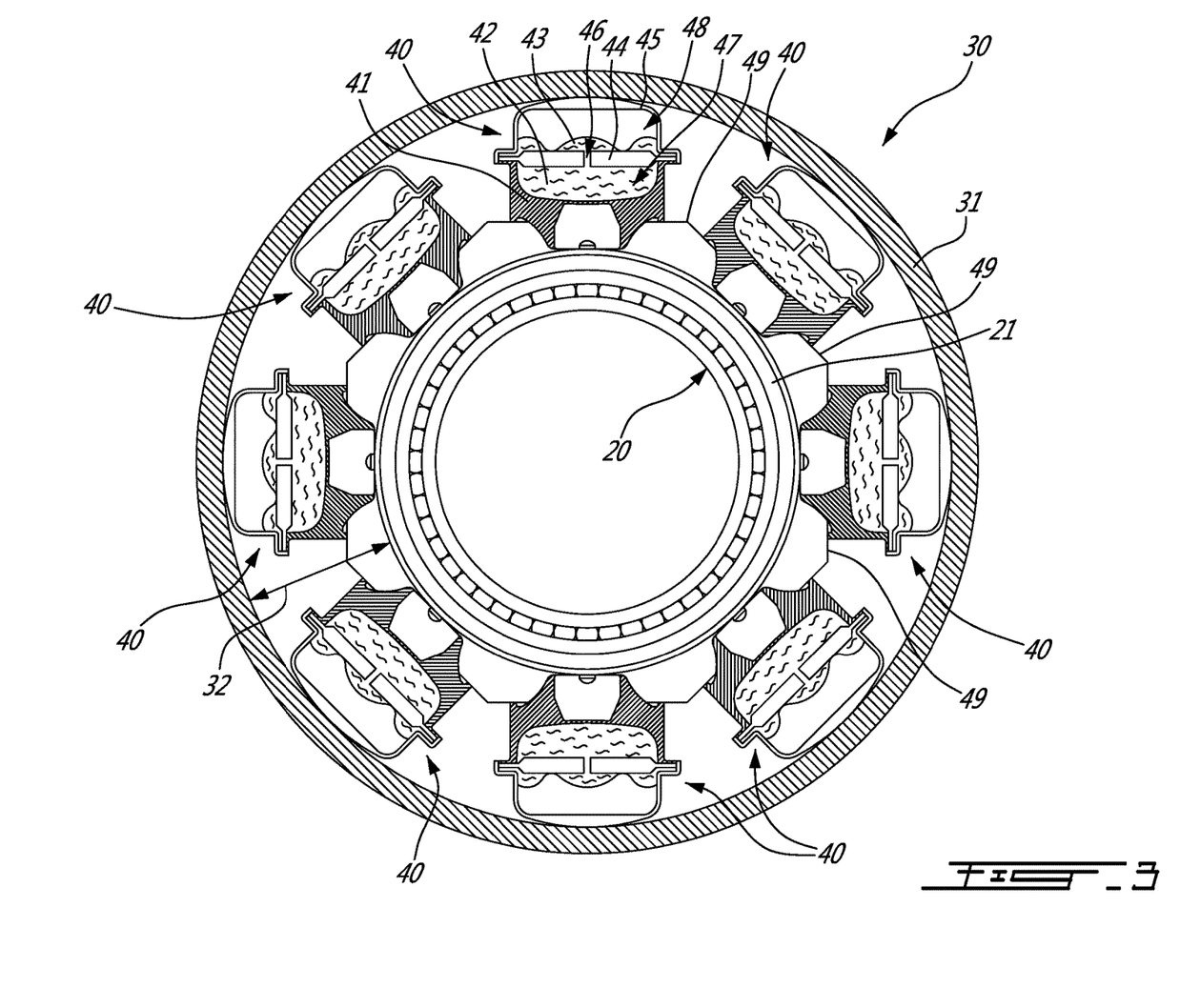
FIG. 3 is a schematic cross-sectional front view of a bearing outer race of a bearing and damping devices, according to a particular embodiment, used with the bearing housing of FIG. 2.

FIGS. 2 and 3 show a particular embodiment of the bearing housing 30 with such damping devices 40. The damping devices 40 may be disposed circumferentially about the bearing outer race 21 and may be spaced apart from one another. In an embodiment, the damping devices 40 may be evenly distributed about the bearing outer race 21, but in other embodiments the damping devices 40 may be disposed unevenly about the bearing outer race 21. The damping devices 40 may interface or connect the bearing outer race 21 and the bearing housing 30. According to an embodiment, the damping devices 40 may be the only structures interconnecting the bearing outer race 21 and the bearing housing 30.

Figure 4A:
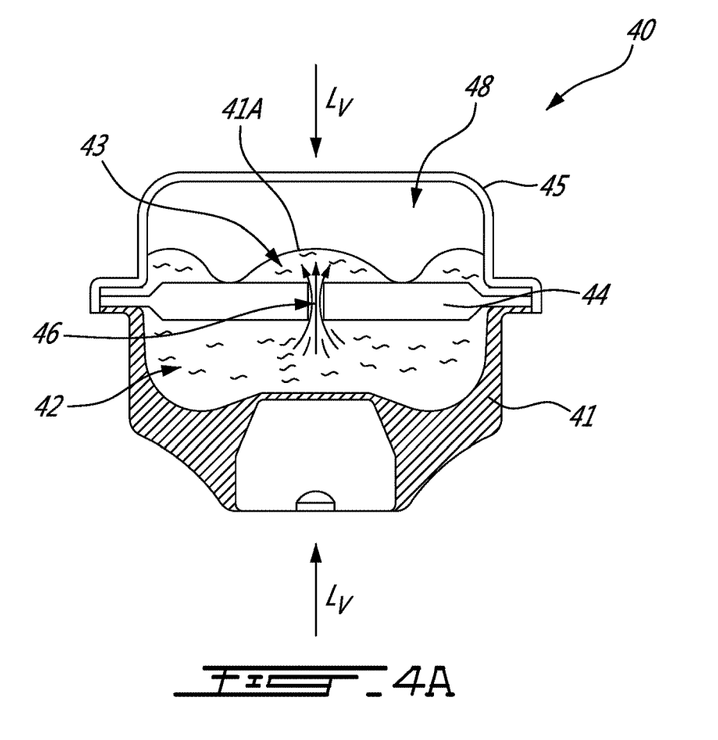
FIG. 4A is a schematic view of a damping device as shown in FIG. 3, where the damping device is shown in an uncompressed state, according to a particular embodiment.
Figure 4B:
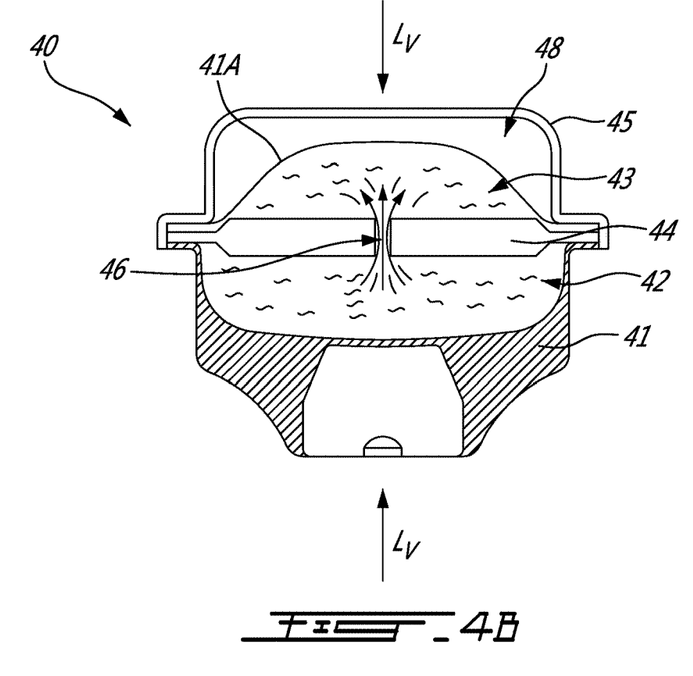
FIG. 4B is a schematic view of a damping device as shown in FIG. 3, where the damping device is shown in a compressed state, according to a particular embodiment.
Figure 4C:
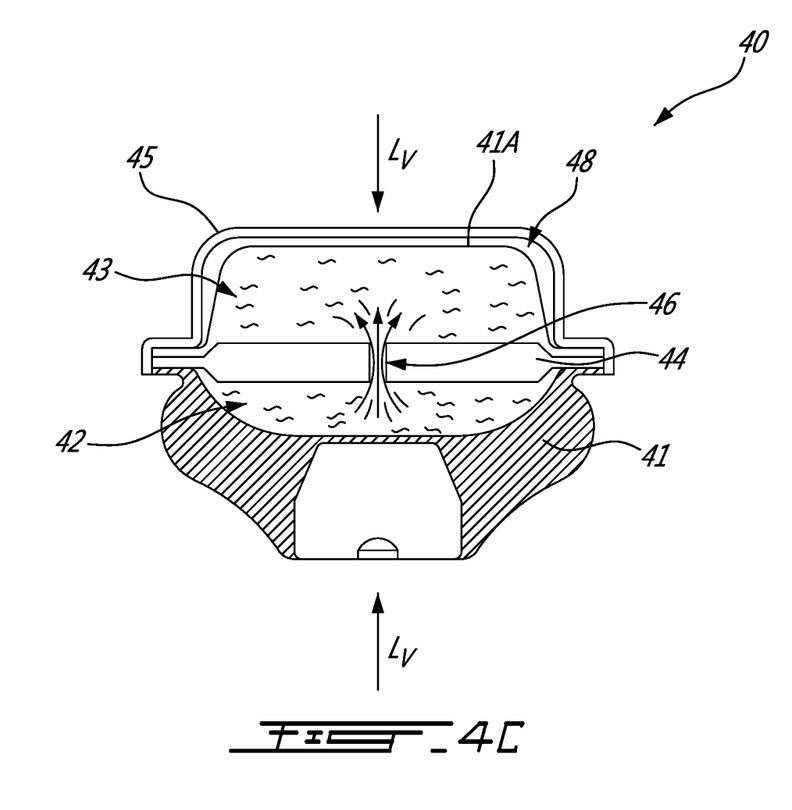
FIG. 4C is a schematic view of a damping device as shown in FIG. 3, where the damping device is shown in another compressed state where the damping device is more compressed than that shown in FIG. 4B, according to a particular embodiment.

Each damping device 40 may comprise an elasto-fluid damping device. Such devices include, for example, an elastomeric body 41, a first and a second fluid chambers 42, 43 (if not more), and a cover portion 45 for covering at least part of the damping device 40. Each damping device 40 may also have a separator 44 separating the first fluid chamber 42 from the second fluid chamber 43. In an embodiment, the elastomeric body 41 may be connected to one of the bearing outer race 21 and the bearing housing 30 and the cover portion 45 may be connected to the other one of the bearing outer race 21 and the bearing housing 30.

In an embodiment, the elastomeric body 41, the separator 44 and the cover portion 45 may be connected together. In an embodiment, each of the elastomeric body 41, the separator 44 and the cover portion 45 may have a complementary flanged portion extending transversally therefrom and by which the elastomeric body 41, the separator 44 and the cover portion 45 may be connected (e.g. linked/attached together by mechanical fasteners, by adhesive bonding, by welding, etc.). In some cases, such connection between the elastomeric body 41, the separator 44 and the cover portion 45 may seal the contour of these respective portions of the damping device 40, thereby preventing fluid communication between the surrounding environment of the damping device 40 and the interior of said damping device 40 (e.g. the fluid chambers 42, 43 located therein). The elastomeric body 41, the separator 44 and the cover portion 45 may be sealingly connected together in other ways than by such flanged portions of that embodiment. In other embodiments, these parts may not be sealingly connected. For instance, they may be removably connected together, such that the damping device 40 may be disassembled (e.g. for maintenance, tuning or carrying out modifications to the damping device 40). In some embodiments, the elastomeric body 41 and the cover portion 45 may be sealingly connected together without such separator 44.

The elastomeric body 41 of the damping device 40 may be connected to one of the bearing outer race 21 and the bearing housing 30 in many suitable ways. For instance, in an embodiment, the elastomeric body 41 may be attached to the bearing outer race 21 with at least one connector (e.g. mechanical fastener). In some embodiments, the elastomeric body 41 may be directly attached to the bearing outer race 21, or there may be other components (e.g. complementary fittings, spacers, etc.) between the elastomeric body 41 and the bearing outer race 21 to secure the damping device 40 to the bearing 20. For instance, in an embodiment, there may be an intermediary structure between the elastomeric body 41 and the bearing outer race 21. The intermediary structure may take the form of an inner wall of the bearing housing 30 that may be connected to a bearing housing peripheral structure 31 (e.g. an outer wall of the bearing housing 30) via a hairpin-shaped wall. Such bearing housing configuration may be referred to as having a hairpin arrangement, with the name derived from the hairpin-like shape of the cross-section of the sequence of the structure 31, said hairpin-shaped wall and said inner wall. Where the bearing housing 30 has a hairpin arrangement, the hairpin-shaped wall may elastically deflect to permit the allowable range of a radial movement of the bearing 20 relative to the bearing housing peripheral structure 31. In an embodiment, the elastomeric body 41 may also be bonded to the bearing outer race 21 using an adhesive, welded to it, etc. In other embodiments, the elastomeric body 41 may be connected to the bearing housing 30 (e.g. the bearing housing peripheral structure 31 or else) instead of or in addition to being connected to the bearing outer race 21.

The cover portion 45 of the damping device 40 may be connected to the bearing housing 30 in many suitable ways. For instance, in an embodiment, the cover portion 45 may be attached to the bearing housing 30 (e.g. the bearing housing peripheral structure 31 or else) with at least one connector (e.g. mechanical fastener). In some embodiments, the cover portion 45 may be directly attached to the bearing housing peripheral structure 31, or there may be other components (e.g. complementary fittings, spacers, other portions of the bearing housing 30, etc.) between the cover portion 45 and the bearing housing peripheral structure 31 to connect the damping device 40 to the bearing housing 30. In an embodiment, the cover portion 45 may also be bonded to the bearing housing 30 (e.g. the bearing housing peripheral structure 31 or else) using an adhesive, welded to it, etc. In other embodiments, the cover portion 45 may be connected to the bearing outer race 21 instead of or in addition to being connected to one or more portions the bearing housing 30.

The cover portion 45 may be shaped to receive portions/parts of the damping device 40 such as the fluid chambers 42, 43 and the separator 44 and allow expansion and contraction of the fluid chambers 42, 43 when fluid is discharged from one chamber to the other during operation, as will be discussed later. For instance, in an embodiment, the cover portion 45 has a cup-like shape, such that it defines a void 48, which may have a domed surface, for at least partially receiving at least one of the first and second fluid chambers 42, 43, the separator 44 or respective portions thereof. The void 48 is large enough to accommodate the volume expansion of the second fluid chamber 43 when the damping device 40 is compressed, as will be discussed later.

In an embodiment, the cover portion 45 may be made at least in part of a rigid material (i.e. not a viscoelastic material), such as alloy (e.g., a metal alloy, a titanium alloy, an aluminium alloy), or a composite material such as a fiber-reinforced material. Other suitable materials may be used. The cover portion 45 may thus not deform substantially during normal operating conditions (e.g. it may act as a rigid body that would not deflect/deform substantially under vibration loads during normal operation) as opposed to the elastomeric body 41, as discussed later. However, in other embodiments, the cover portion 45 may deflect/deform when subject to such vibration loading. To this end, its shape, its material, or a combination thereof, may be selected to allow a selected range of deflection during operation. Yet, in some embodiments, the cover portion 45 may be made (partially or entirely) of a viscoelastic material, such as rubber, a lattice structure like a metal foam, etc. This may thus allow greater flexibility of the damping device 40 and/or provide more rigidity and/or damping tuning possibilities of the damping device 40 in some practical applications.

The elastomeric body 41 may have many suitable shapes and may include many types of elastomeric material. For instance, in an embodiment, the elastomeric body 41 may be made of rubber (i.e. substantially or entirely made of rubber). In other embodiments, the elastomeric body 41 may be made of a lattice structure, such as a metal foam. Other materials with viscoelastic properties may be used. Viscoelastic materials may absorb energy/loads when deformed (i.e. they may damp/dissipate energy/load), for instance, damping/dissipating vibrations during operation of the gas turbine engine 10, including vibrations caused by unbalanced rotating parts, such as shafts, blades, fan, rotors, etc. The material used for the elastomeric body 41 must be capable of withstanding typical operational temperatures and pressures of a gas turbine engine, when the damping devices 40 are used in such circumstances.

In an embodiment, the first fluid chamber 42, which may be referred to as the main fluid chamber, may be circumscribed by the elastomeric body 41 and the separator 44, which may be in the form of a plate in an embodiment. The elastomeric body 41 may have a cavity 47 with a domed surface defined therein and the separator 44 may be disposed at least partially within said cavity 47, such that a space may be defined between the separator 44 and the domed surface of the cavity 47. In an embodiment, the cavity 47 itself may define the first fluid chamber 42, but this may be different in other cases. For instance, in some embodiments, the first fluid chamber 42 may be implemented by a bladder (e.g. impermeable bladder) containing fluid and disposed within the cavity 47. In such embodiments, the bladder may be stretchable (e.g. flexible, elastically deformable), such that its internal volume may expand and contract to receive more or less fluid, or it may have a finite internal volume (i.e. it may not stretch). Other fluid containers may implement the first fluid chamber 42 in other embodiments.

Similarly, the second fluid chamber 43 may be implemented in many ways, including a bladder or other fluid containers, as discussed above with respect to the first fluid chamber 42. In an embodiment, the second fluid chamber 43 may be circumscribed by the domed surface of the void 48 of the cover portion 45 and the separator 44, and the void 48 itself may define the second fluid chamber 43. In other cases, the second fluid chamber 43 may be defined by a separate fluid container (e.g. not the void 48 itself), although the domed surface of the void 48 would still circumscribe the fluid container defining said second fluid chamber 43, similar to that discussed above with respect to the first fluid chamber 42. The fluid chamber 43 may also be part of the elastomeric body 41, in that the fluid chamber 43 may be implemented by a portion of the elastomeric body 41. For instance, such portion may define a membrane 41A, substantially thinner than the remainder of the elastomeric body 41, that may be at least partially made of a material of the elastomeric body 41. Stated differently, the membrane 41A may be made of the elastomeric material of the body 41. The membrane 41A may also be separate from the elastomeric body 41. The membrane 41A may be elastically stretchable, such that when a volume of fluid discharged in the fluid chamber 43 exceeds an initial internal volume of the fluid chamber 43, the membrane 41A may elastically stretch, thereby allowing the fluid chamber 43 to expand (i.e. deform) for receiving more fluid than what the initial internal volume of the fluid chamber 43 may have received prior to expanding, i.e., the "at rest" volume.

In an embodiment, the first and second fluid chambers 42, 43 may be formed as a common part. Stated differently, instead of being made as distinct parts (e.g. distinct bladder or fluid container fluidly connected together) interconnected together, the first and second fluid chambers 42, 43 may be implemented as a single fluid container in which the separator 44 may be disposed and where the separator 44 may separate an internal volume of said fluid container into two chambers, thereby implementing the first and second chambers 42, 43. Similarly, the cavity 47 of the elastomeric body 41, the void 48 of the cover portion 45 and the separator 44 that may be contained therein may form the first and second chambers 42, 43 in other embodiments. In some cases, where the membrane 41A is present, the cavity 47 may itself define the first fluid chamber 42 (i.e. the space between the separator 44 and the domed surface of the cavity 47) while the membrane 41A and the separator 44 may circumscribe and define the second fluid chamber 43, such that both the first and second fluid chambers 42, 43 may be circumscribed by respective portions the elastomeric body 41.

It is to be understood from the above that, in some embodiments, the first and second fluid chambers 42, 43 may not fill the entire internal volume of the cavity 47 and the space defined by the void 48, respectively. Stated differently, the cavity 47 and the void 48 may have a larger internal volume than that of the first and second fluid chambers 42, 43. Additionally, the cavity 47 and the void 48 may have comparatively the same or a different internal volume, just as the first and second fluid chambers 42, 43 may also have the same or a different internal volume (e.g. maximum internal volume of the first fluid chamber 42 when the elastomeric body 41 is uncompressed versus maximum volume of the second fluid chamber 43 when completely expanded and/or where the fluid chamber 43 is prevented from expanding more due to the surrounding cover portion 45) to receive comparatively more or less fluid. For instance, in some embodiments, the first fluid chamber 42 is larger than the second fluid chamber 43. More particularly, in some cases, the first fluid chamber 42 may be twice the size of the second fluid chamber 43, in some cases thrice the size of the second fluid chamber 43, and in some cases an even greater size compared to the second fluid chamber 43. This however does not preclude from having a second fluid chamber 43 larger than the first fluid chamber 42 in some other cases.

The damping device 40 includes fluid encapsulated in the first and second fluid chambers 42, 43. Such fluid may contribute to damping/dissipating vibrations passing through the damping device 40 in some ways that will be discussed later. The fluid contained in the fluid chambers 42, 43 may be selected for allowing a vibratory response (also known as the frequency response) suitable for an operating/loading condition of the gas turbine engine 10. Stated differently, the fluid inside the damping device 40 may affect the vibrational behaviour of the damping device 40 and in turn the resulting vibratory response of the assembly of the damping device 40 and the bearing housing 30 as a whole. As such, depending on the fluid (e.g. properties of the fluid such as its viscosity) contained in the damping device 40, the vibratory response of the damping device 40, which is related to its capacity to damp/dissipate vibrations passing through the damping device 40 via the bearing 20, may be affected (e.g. the damping device 40 may damp/dissipate more or less vibrations in a given range of vibration frequencies).

The fluid may be a gas, a liquid, or a combination thereof in some embodiments. For instance, in some cases, the fluid may be a Newtonian fluid (i.e. fluid having a viscosity substantially constant over a wide range of shear rates). In other cases it may be a non-Newtonian fluid (i.e. fluid having a viscosity that varies depending on the shear rates). For instance, in some cases, the fluid may be oil or a silicon-based fluid. In some cases, the fluid may contain metallic particles, such that the fluid may have magnetorheological properties. In such cases, the viscosity of the fluid may be tuned automatically (e.g. by coupling the damping device 40 with a computer-based system controlling an electromagnetic field in the vicinity of the fluid contained in the fluid chambers 42, 32) based on certain engine or other aircraft parameters (e.g. ambient temperature/pressure, power commands to the engine 10, altitude of operation of the engine 10, etc.). However, other fluids or a combination of different fluids (e.g. more than one liquid or gas, or a combination of one or more liquids and gases) that may sustain high temperature and temperature variations may be used. The fluid contained in the damping device 40 may also be selected for its environmentally friendly properties, fireproof properties, its capacity to have a stable dynamic viscosity over a large range of temperature variations and/or pressure variations. The fluid may also be selected to resist degradation with age and/or be inert. As the fluids that may be contained in the damping device 40 are to be used in a gas turbine engine 10, low boiling point fluids with very low viscosity may not be suitable in practice. That is, fluids with a high boiling point and/or with high dynamic viscosity may be preferred.

A dynamic viscosity of the fluid at a given temperature may be measured using known apparatus (e.g. viscometers, rheometers, vibrational viscometers, etc.) and techniques. In some cases, the dynamic viscosity of the fluid measured at about 25° C. may range from about 0.05 to 0.5 Pas. More particularly, in some cases, the dynamic viscosity of the fluid measured at about 25° C. may be about 0.3 Pas.

In an embodiment, the separator 44 may be made of a rigid material, such as an alloy (e.g., a metal alloy, a titanium alloy, an aluminium alloy), or a composite material such as a fiber-reinforced material. Although made of such rigid material, the separator 44 may or may not flex/bend (as opposed to being totally rigid in operation, as it may be the case in some embodiments) because of its plate-like shape and relatively thin dimension. Also, the separator 44, which may be in the form of a plate, may have a constant thickness or may vary in thickness. For instance, in some embodiments, where the separator 44 has a flanged portion extending transversally thereto, the flanged portion may be thinner than the remainder of the separator 44. However, this configuration may be different in other embodiments.

In some embodiments, the separator 44 may be an integral part of one of the elastomeric body 41 and/or the cover portion 45. For instance, the separator 44 may not be a distinct part of the damping device 40, but rather implemented by a portion of the elastomeric 41 or the cover portion 45 themselves. Stated differently, the shape of the elastomeric body 41 and/or the cover portion 45 may include a portion extending inwardly to close at least partially the cavity 47 and/or the void 48, such that there may be no distinct separator 44 per se in between them.

The separator 44 may have at least an orifice 46 defined therethrough, if not more than one. The at least one orifice 46 may fluidly connect the first and second fluid chamber 42, 43. The bore size of each orifice 46 is selected to provide a flow rate dependent upon the amount of damping required for the damping device 40 (e.g. selected for a specific practical application). For instance, a smaller orifice 46 may restrict the fluid from flowing between the first and second fluid chambers 42, 43 more than a larger orifice 46. That is, the damping over an allowable range of movement provided by a damping device 40 with a small orifice 46 may be greater than that when the orifice 46 is larger. For instance, the bore size may range from 0.05 inch to 0.5 inch in some cases. Other values outside this range may also be possible.

The shape of the orifice 46 may also vary depending on the embodiment. In an embodiment, the orifice 46 may be cylindrical and may have a constant bore size. In other embodiments, the orifice 46 may be flared. Such flared orifice 46 may affect how the fluid flows therethrough in one direction versus the other (e.g. the fluid may flow more easily in one direction than in the opposite one). For instance, this may affect how the damping is effected when the damping device 40 is compressed versus when it is being unloaded. The orifice 46 may also have other shapes instead of being cylindrical, such as a squared shape, a triangular shape or other hole or slot shape. In embodiments where there are more than one orifices 46, the orifices 46 may have all the same shape, or different shapes. In some embodiments, there may a plurality of orifices or passageways with varying bore sizes, orientations, and/or length. For instance, a network of passageways may be machined in the separator 44 and may implement a canal network fluidly connecting the fluid chambers 42, 43 together, where the canal network may include a plurality of passageways fluidly connected to one another and routing the fluid through the separator 44. This may provide more tunability of the damping achieved by the damping device 40 by controlling the flow rate and damping behaviour more precisely, compared to other embodiments.

A radial gap 32 may be defined between the bearing outer race 21 and the bearing housing 30. This radial gap 32 may surround the bearing outer race 21, thereby defining an annular space between the bearing outer race 21 (or the intermediary structure as discussed above with respect to some embodiments) and the bearing housing 30 (e.g. the bearing housing peripheral structure 31). For instance, in embodiments where the bearing housing 30 has a hairpin arrangement, such radial gap 32 may be defined between the inner wall and the outer wall of the bearing housing 30. The damping devices 40 may be located in such annular space. As the radial gap 32 is being reduced at a location about the bearing outer race 21, the elastomeric body 41 of at least one of the damping devices 40 at this location may elastically deform (at this location, compress) and allow the bearing 20 attached thereto to move radially over a selected allowable range of radial movement. In some embodiments, the allowable range of radial movement may be at most 0.2 inch. More particularly, in some cases, the allowable range of radial movement may be no more than 0.2 inch, in some cases no more than 0.1 inch, and in some cases even less.

As the elastomeric body 41 deflects (e.g. compresses due to a vibration load Lv), it may absorb at least partially the vibrations due to its viscoelastic properties, and the internal volume of the fluid chamber 42 may vary (i.e. reduce as it deforms) when the vibration load Lv exceeds a vibration amplitude threshold. Incidentally, the fluid contained in the first chamber 42 may be discharged therefrom through the orifice 46 to the second fluid chamber 43 (illustrated in FIGS. 4A to 4C). When this scenario occurs, the fluid flowing from the first chamber 42 to the second chamber 43 through the orifice 46 is restricted from flowing therethrough, owing to the fluid viscosity and bore size of the orifice 46 by which the fluid flows, as discussed previously. Stated differently, the flow rate of the fluid through the orifice 46 may depend from the combination of the bore size of the orifice 46 and the viscosity (also called the thickness) of the fluid. Such flow rate is thus inversely proportional to the amount of damping that the damping devices 40 may provide over the allowable range of radial movement. The flow rate may also be limited by the resistance to deformation (i.e. rigidity) of the membrane 41A in embodiments where such membrane 41A is present. As discussed above, the membrane 41A may elastically stretch to allow an expansion of the fluid chamber 43. Although the membrane 41A may stretch, it may oppose a resistance to stretching proportional to its rigidity (e.g. a rigidity that may be measured as a Young modulus, for instance). In an embodiment, the membrane 41A may elastically stretch to expand the fluid chamber 43 and accommodate the volume of fluid discharged therein until the internal volume of the fluid chamber 43 completely fills the void 48 of the cover portion 45. When this scenario occurs, no more fluid may be discharged into the second fluid chamber 43, and the elastomeric body 41 may be prevented from further compressing. Consequently, the damping device 40 may implement or act as a rigidifying member (e.g. a snubber) interconnecting the bearing outer race 21 and the supporting structure 31, as it may oppose a resistance that may prevent the radial gap 32 from reducing more than the selected allowable range of radial movement (i.e. a radial movement of the bearing 20 exceeding the selected allowable range of radial movement is prevented). Once the gap 43 is reduced as much as the allowable range of radial movement of the bearing 20 (stated differently, where the gap 32 may no longer decrease), no more radial movement of the bearing 20 relative to the bearing housing 30 may be allowed. The damping device 40 may thus prevent any further radial movement of the bearing 20 outside the allowable range of radial movement.

As one or more of the damping devices 40 in the annular space may compress while the gap 32 decreases at a location about the bearing outer race 21, the one or more damping devices 40 on the opposite side of the bearing outer race 21 (i.e. at an opposite location about the bearing outer race 21) may correspondingly deform in tension (stretched). Alternately, the damping devices 40 that are not substantially aligned with the direction of the radial vibration may also deform in a shearing fashion, whereby their respective elastomeric body 41 may shear transversally to their respective axial direction. Such transverse deformation of the elastomeric body 41 may also absorb at least partially vibrations, again due to the viscoelastic properties of such body 41. Additionally, such transverse deformation may force the fluid inside the first fluid chamber 42 to discharge in the second fluid chamber 43, thereby also contributing to damping. The individual contributions by compressing, stretching and/or shearing of all the damping devices 40 working in unison and surrounding the bearing outer race 21, may thus result in improved damping capacities over a system having a single one of such damping devices 40. The circumferential disposition of the plurality of damping devices 40 according to the present disclosure may thus offer a structural assembly with tuned stiffness and damping characteristics adapted to gas turbine engine applications. In an embodiment, more than one damping devices 40 may be mounted in series (e.g. one on top of the other) instead of or in addition to being disposed and work in parallel around the bearing outer race 21 as discussed above.

In an embodiment (not shown), there may be more than two fluid chambers in the damping device 40. For instance there may be one or more additional fluid chambers, in series or in parallel with the first and/or second fluid chambers 42, 43. In such cases, the damping behaviour of the damping device 40 may be discretized in more than one damping stage. This may help better adapting the vibratory response of the damping device 40 under different and/or subsequent operating/loading conditions/parameters. For instance, in an embodiment (not shown), a third fluid chamber may be fluidly connected to the second fluid chamber 43. In such embodiment, the second fluid chamber 43 may discharge its fluid into the third fluid chamber, at a selected flow rate, which may be different than the flow rate between the first and second fluid chambers 42, 43. Such configuration may impact the damping behaviour of this variant of the damping device 40 compared to the other embodiments discussed above. In embodiments where there is a third fluid chamber, there may be an additional separator between the second fluid chamber 43 and the third fluid chamber, similarly to what was discussed above with respect to other embodiments.

In some embodiments, instead of having fluid chambers 42, 43 sealed to prevent exchanging fluid with the outside of the damping device(s) 40, the damping device(s) 40 may be connected to a fluid cooling system (not shown), such that fluids may enter the chambers 42, 43 by a fluid input and exit the chambers 42, 43 by a fluid output, both defined through the damping device 40 (e.g. walls of at least one of the chambers 42, 43, through the elastomeric body 41, the cover portion 45 and/or through the separator 44) and allowing a circulation of the fluid contained inside the damping device(s) 40 in a fluid cooling system to control a temperature of the fluid of the damping device(s) 40 during operation. For instance, this may ensure that the fluid in the damping device(s) 40 during operation of the engine 10, stay within an optimal temperature range with optimal damping properties.

Yet, in an embodiment, the damping devices 40 may be interconnected together in addition to being indirectly connected together via the bearing outer race 21 (or intermediary structure, as discussed above with respect to some embodiments). For instance, in an embodiment, each damping device 40 has attachment portions 49 extending transversally toward adjacent ones of the damping devices 40, such that the attachment portions 49 of adjacent ones of the damping devices 40 may be connected together (e.g. attached by one or more connectors, such as mechanical fastener(s) bonded together, welded together, etc.). In such embodiment, although the attachment portions 49 of adjacent ones of the damping devices 40 may be attached together, a relative movement between adjacent ones of the damping devices 40 may still occur (e.g. attachment portions 49 may be flexible, attached to one another such that they may move relative to one another, etc.).

The damping device 40 may implement a tunable mechanism where damping and stiffness may be beneficial to a selected practical application. The damping and/or stiffness of the device 40 may thus be selected to behave according to specific operating requirements, for instance for a specific gas turbine engine 10 or specific working conditions of such engine 10. This may improve the durability and/or performance of the engine 10, including its capacity to better support the detrimental effects of weight imbalances of rotating parts of the engine 10.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A bearing support for a bearing housing, comprising:
   a plurality of damping devices connecting the bearing housing to an outer race of the bearing, the plurality of damping devices disposed circumferentially about the bearing outer race and spaced apart from one another, the damping devices including:

an elastomeric body, a cover portion, at least a first and a second deformable fluid chambers fluidly connected to one another via at least one orifice, the first and second fluid chambers disposed between the elastomeric body and the cover portion, at least one of the at least first and second fluid chambers configured to discharge fluid into the other one of the at least first and second fluid chambers upon deforming the elastomeric body.

2. The bearing support as defined in claim 1, wherein at least one of the at least first and second fluid chambers is circumscribed by a portion of the elastomeric body.

3. The bearing support as defined in claim 2, wherein the portion of the elastomeric body circumscribing at least one of the at least first and second fluid chambers defines an elastically stretchable membrane.

4. The bearing support as defined in claim 1, wherein the elastomeric body is connected to the bearing outer race and the cover portion is connected to the bearing housing.

5. The bearing support as defined in claim 1, wherein the damping devices further comprise a separator separating the first fluid chamber from the second fluid chamber.

6. The bearing support as defined in claim 1, wherein the first fluid chamber is larger than the second fluid chamber.

7. The bearing support as defined in claim 1, wherein the elastomeric body has a cavity with a domed surface defined therein.

8. The bearing support as defined in claim 7, wherein the cavity defines the first fluid chamber.

9. The bearing support as defined in claim 1, wherein the cover portion has a void with a domed surface defined therein.

10. The bearing support as defined in claim 9, wherein the void circumscribes the second fluid chamber.

11. A bearing support for a bearing housing, comprising:

a plurality of elasto-fluid dampers connecting the bearing housing to a bearing outer race, the plurality of elasto-fluid dampers disposed circumferentially about the bearing outer race and spaced apart from one another, the elasto-fluid dampers being individual dampers separated from one another.

12. The bearing support as defined in claim 11, wherein the plurality of elasto-fluid dampers include an elastomeric body connected to one of the bearing outer race and the bearing housing, a cover portion connected to the other one of the bearing outer race and the bearing housing, at least a first and a second deformable fluid chambers fluidly connected to one another via at least one orifice, the first and second fluid chambers disposed between the elastomeric body and the cover portion, at least one of the at least first and second fluid chambers configured to discharge fluid into the other one of the at least first and second fluid chambers upon deforming the elastomeric body.

13. The bearing support as defined in claim 12, wherein at least one of the at least first and second fluid chambers is circumscribed by a portion of the elastomeric body.

14. The bearing support as defined in claim 13, wherein the portion of the elastomeric body circumscribing at least one of the at least first and second fluid chambers defines an elastically stretchable membrane.

15. The bearing support as defined in claim 12, wherein the plurality of elasto-fluid dampers further comprise a separator separating the first fluid chamber from the second fluid chamber.

16. The bearing support as defined in claim 12, wherein the elastomeric body has a cavity with a domed surface defined therein.

17. The bearing support as defined in claim 16, wherein the cavity defines the first fluid chamber.

18. The bearing support as defined in claim 12, wherein the cover portion has a void with a domed surface defined therein.

19. The bearing support as defined in claim 18, wherein the void circumscribes the second fluid chamber.

20. A method for dissipating at least partially vibrations travelling between a bearing housing and a bearing outer race using a plurality of damping devices interconnecting said bearing housing and said bearing outer race, the method comprising:

compressing an elastomeric body of at least one of the damping devices, thereby deforming said elastomeric body in a compressed state and incidentally absorbing at least partially vibrations passing through the at least one of the damping devices;

deforming a first fluid chamber of the at least one of the damping devices as a result of the compressing; and discharging fluid contained in the first fluid chamber towards a second fluid chamber of the at least one of the damping devices as a result of the deforming, the fluid flowing through at least one orifice fluidly connecting said first and second fluid chambers together, thereby damping at least partially vibrations passing through the at least one of the damping devices.

* * * * *